US012608055B2

(12) United States Patent　　　　　(10) Patent No.:　US 12,608,055 B2

Voli et al.　　　　　　　　　　　　　(45) Date of Patent:　Apr. 21, 2026

---

(54) INTEGRATED DISPLAY AND COMMUNICATIONS MODULE FOR COMPUTING DEVICES

(71) Applicant: ZEBRA TECHNOLOGIES CORPORATION, Lincolnshire, IL (US)

(72) Inventors: Edward M. Voli, East Setauket, NY (US); Dae Suk Noh, Vernon Hills, IL (US); Michele B. Feinstein, Oceanside, NY (US); Nicolas Fornier, Marseilles (FR)

(73) Assignee: Zebra Technologies Corporation, Lincolnshire, IL (US)

( * ) Notice: Subject to any disclaimer, the term of this patent is extended or adjusted under 35 U.S.C. 154(b) by 111 days.

(21) Appl. No.: 18/384,425

(22) Filed: Oct. 27, 2023

(65) Prior Publication Data

US 2025/0138598 A1　　May 1, 2025

(51) Int. Cl.
| | |
|---|---|
| *G06F 1/16* | (2006.01) |
| *H01Q 1/22* | (2006.01) |
| *H01Q 1/42* | (2006.01) |
| *H01Q 1/52* | (2006.01) |

(52) U.S. Cl.
CPC .......... *G06F 1/1698* (2013.01); *G06F 1/1656* (2013.01); *H01Q 1/2266* (2013.01); *H01Q 1/42* (2013.01); *H01Q 1/526* (2013.01)

(58) Field of Classification Search
CPC .................................................. G06F 1/1698
See application file for complete search history.

(56) References Cited

U.S. PATENT DOCUMENTS

| | | | | |
|---|---|---|---|---|
| 8,208,980 | B2 * | 6/2012 | Wong | H01Q 5/371 |
| | | | | 343/702 |
| 8,248,777 | B2 * | 8/2012 | Prest | H05K 5/0217 |
| | | | | 248/560 |
| 8,676,116 | B2 | 3/2014 | Zhu et al. | |
| 9,609,096 | B2 | 3/2017 | Zhu et al. | |
| 9,966,659 | B2 * | 5/2018 | Chakam | H01Q 1/241 |
| 10,623,540 | B2 | 4/2020 | Zhu et al. | |
| 10,809,564 | B1 | 10/2020 | Bidari | |
| 11,450,964 | B2 * | 9/2022 | Jeong | H01Q 5/385 |
| 12,212,057 | B2 * | 1/2025 | Casazzone | H01Q 21/28 |
| 2009/0290294 | A1 * | 11/2009 | Prest | G11B 33/08 |
| | | | | 361/679.01 |

(Continued)

FOREIGN PATENT DOCUMENTS

CN　　　105552526　A　　5/2016

OTHER PUBLICATIONS

European Search Report for European patent application No. 24208475 mailed on Mar. 7, 2025.

(Continued)

*Primary Examiner* — Adrian S Wilson

(57)　　　　ABSTRACT

A computing device includes: a housing; a display assembly supported by the housing, the display assembly including: an outer layer disposed at an exterior of the housing; a conductive shield disposed within the housing; a light emitter and a display layer disposed between the outer layer and the conductive shield; and an antenna mounted between the conductive shield and the light emitter, the antenna configured for wireless communication through the outer layer.

13 Claims, 7 Drawing Sheets

(56)     References Cited

U.S. PATENT DOCUMENTS

| | | | |
|---|---|---|---|
| 2013/0248601 A1 | 9/2013 | Liang et al. | |
| 2015/0311960 A1* | 10/2015 | Samardzija | G04G 21/04 |
| | | | 455/90.3 |
| 2021/0175636 A1* | 6/2021 | Lasiter | H01Q 21/26 |
| 2022/0077586 A1* | 3/2022 | Jeong | H01Q 1/526 |
| 2023/0021251 A1 | 1/2023 | Wang et al. | |
| 2023/0268645 A1* | 8/2023 | Casazzone | H01Q 1/528 |
| | | | 343/767 |

OTHER PUBLICATIONS

Search Report of Apr. 17, 2025 from UKIPO for Great Britain patent application No. GB2415477.5 filed Oct. 21, 2024.

* cited by examiner

INTEGRATED DISPLAY AND COMMUNICATIONS MODULE FOR COMPUTING DEVICES

BACKGROUND

Computing devices may include communications interfaces, such as near-field communications (NFC) interfaces. The performance of a communications interface may be impacted by other components of the computing device, such as a display.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
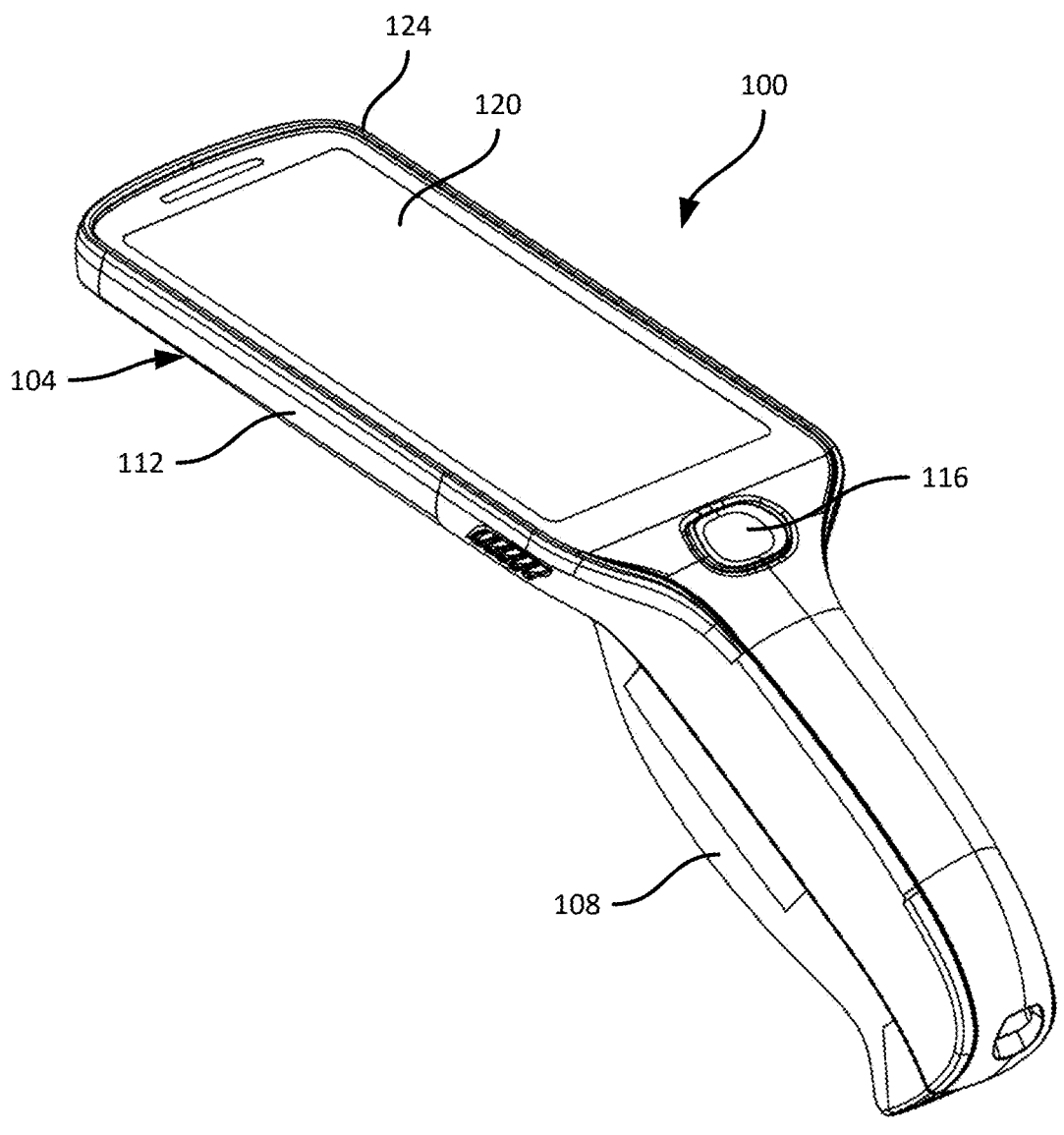
FIG. 1 is a diagram of a computing device, viewed from the front.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a computing device comprising: a housing; a display assembly supported by the housing, the display assembly including: an outer layer disposed at an exterior of the housing; a conductive shield disposed within the housing; a light emitter and a display layer disposed between the outer layer and the conductive shield; and an antenna mounted between the conductive shield and the light emitter, the antenna configured for wireless communication through the outer layer.

Additional examples disclosed herein are directed to a display module for a computing device, the display module comprising: a display sub-assembly including: an outer layer; a display layer; and a backlight; and a communications sub-assembly including: a conductive shield; and an antenna mounted to a surface of the conductive shield configured to face towards the backlight, the antenna configured for wireless communication through the outer layer.

FIG. 1 illustrates a computing device 100 (also referred to herein as the device 100), such as a handheld barcode scanner, e.g., configured to be deployed in a retail facility as a personal shopping device. In other examples, the device 100 can have any of a variety of other mobile form factors. For example, the device 100 can include a smartphone, a tablet computer, a wearable mobile computer, or the like. In further examples, the device 100 can be deployed in a substantially fixed configuration, e.g., at a retail checkout counter as a barcode scanner, or the like.

The device 100 includes a housing 104, which in this example has a handheld form factor including a handle 108 and a body 112. The handle 108 can support an input 116 such a button, trigger, or the like, and the body 112 can support various other internal components of the device 100, including a display assembly having an outer layer 120 disposed at an exterior of the housing 104. That is, the outer layer 120 of the display assembly is exposed to an exterior of the device 100, and can define, e.g., along with a bezel portion 124 of the housing 104, a front of the device 100. The body 112 can support further components of the display assembly, as discussed below. The body 112 and/or the handle 108 can also contain various other internal components of the device 100, such as hardware controller(s), memory circuit(s), sensors (e.g., barcode sensors, cameras, location sensors, and the like), communications interfaces, and the like.

Figure 2:
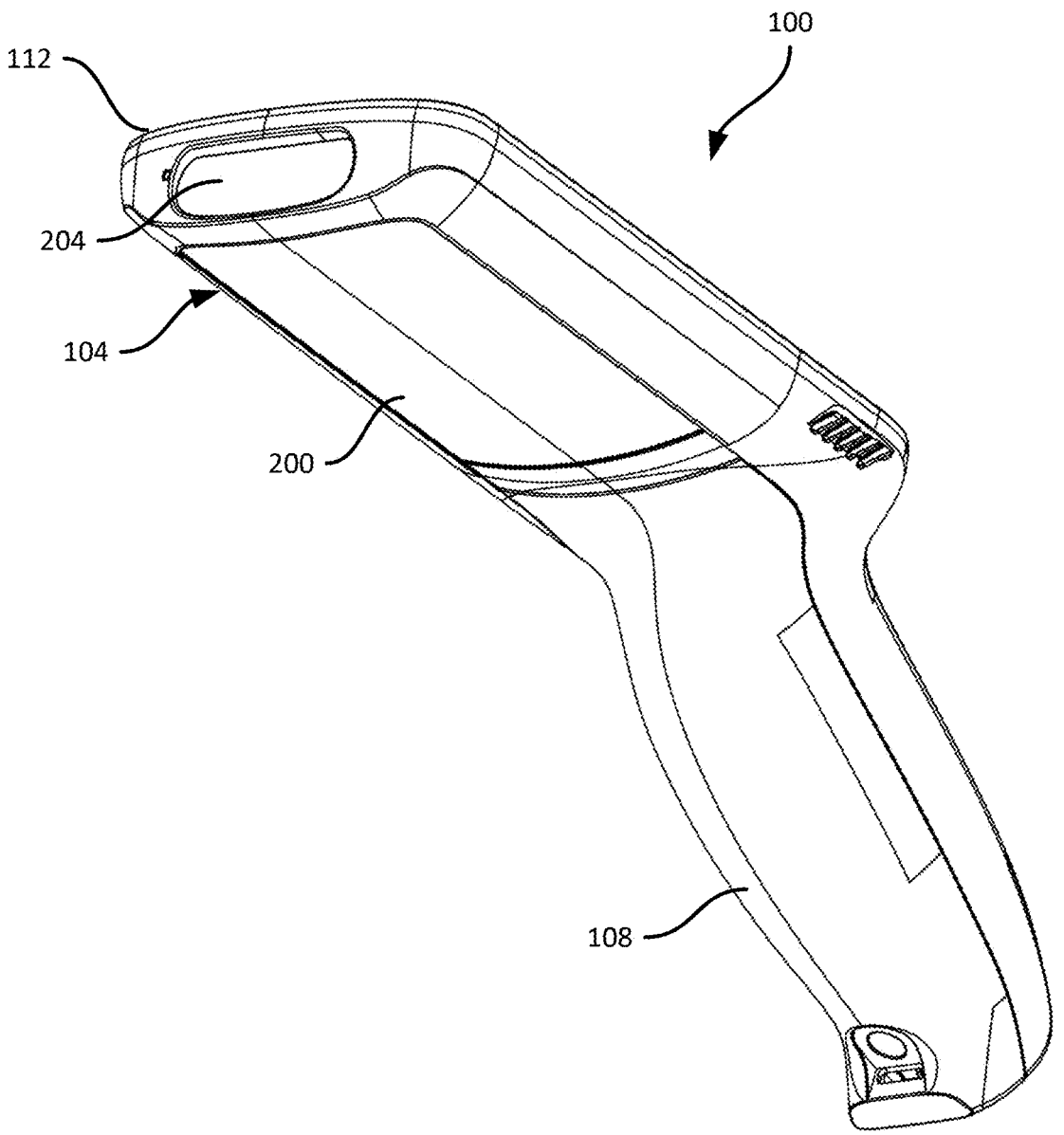
FIG. 2 is a diagram of the computing device of FIG. 1, viewed from the rear.

FIG. 2 illustrates the device 100 from the back, showing a rear 200 of the body 112, opposite the outer layer 120 of the display assembly. FIG. 2 also illustrates a window 204, e.g., of a barcode scanning assembly or other sensor assembly of the device 100. Some computing devices include communications interfaces such as NFC or other short-range interfaces, configured to communicate over distances of up to about 5 cm. The performance of such interfaces may be impacted by other components of the device 100. As will be discussed below, the display assembly of the device 100 includes a conductive shield supported within the housing 104. The shield can impede antenna performance, e.g., of an NFC antenna mounted within the body 112, and some devices therefore arrange short-range communications interfaces such as NFC interfaces so as to radiate primarily through the rear 200 of the device 100, away from the conductive shield (which may reduce the performance of short-range communication, or prevent short-range communication, through the outer layer 120).

The device 100, in contrast, includes certain structural features discussed below that permit short-range communication through the outer layer 120, e.g., such that an operator of the device 100 can view the outer layer 120 of the display while placing an object, tag, or the like, in proximity to the display to initiate a scan or other data exchange.

Figure 3:
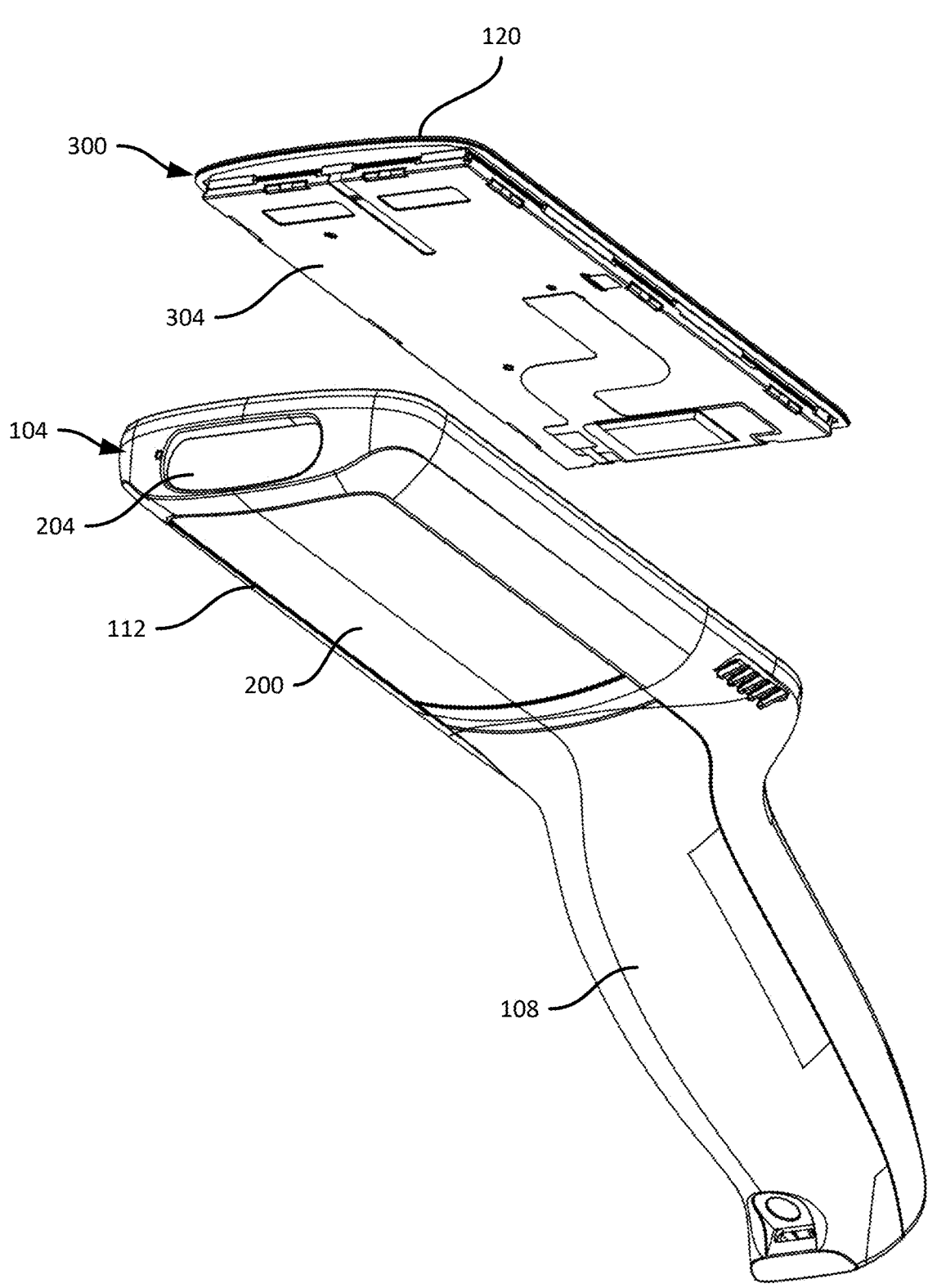
FIG. 3 is a partially exploded view of the computing device of FIG. 1.

Turning to FIG. 3, a partially exploded view of the device 100 is shown in which the integrated display and communications module 300, also referred to herein as the display module 300 or the display assembly 300, is removed from the housing 104. As seen in FIG. 3, the display module 300 includes the outer layer 120, e.g., a layer of glass or other transparent material forming an outer surface of the display module 300. The display module 300 also includes a conductive shield 304 forming an inner surface of the display module 300. That is, the conductive shield 304 separates, within the housing 104 (and particularly the body 112, in this example) the other components of the display module 300 from the remaining components supported within the body 112. Those remaining components can include one or more circuit boards carrying and/or connected to controllers, sensors, other communications interfaces, and the like. The shield 304 can be configured to protect the components of the display module 300 from electrostatic discharge, and/or to mitigate the impact of electromagnetic interference from the display module 300 on the other components within the body 112.

As will be apparent, the shield 304 may also prevent effective short-range communication in a direction of the outer layer 120 (e.g., with another device or object placed adjacent to the outer layer 120) from an antenna disposed within the body 112 such that the conductive shield 304 is arranged between the antenna and the outer layer 120. The device 100 is therefore structured to place an antenna, such as an NFC antenna, within the display module 300, between the shield 304 and the outer layer 120. The placement of an antenna between the shield 304 and the front of the device 100 may enable short-range communication through the outer layer 120 that may have otherwise been impeded or prevented by the shield 304.

Figure 4:
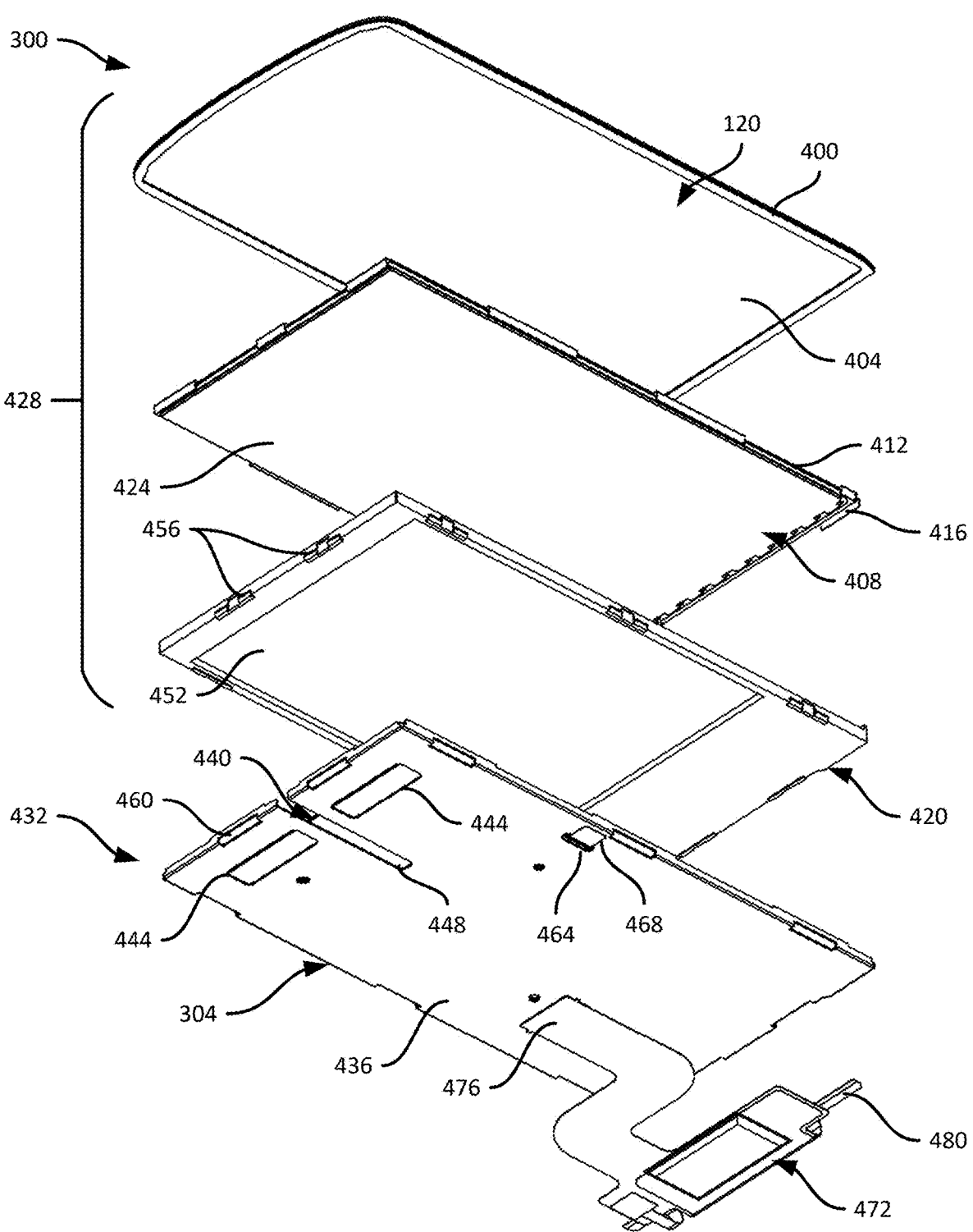
FIG. 4 is a partially exploded view of a display module of computing device of FIG. 1.

Turning to FIG. 4, a partially exploded view of the display module 300 is shown. The outer layer 120 can include a sheet of glass or other transparent material, e.g., with a bezel 400 extending around a perimeter thereof. The bezel 400 can, for example, seal the perimeter of the outer layer 120 to the body 112 of the housing 104. The module 300 further includes, adjacent to an inner surface 404 the outer layer 120 (e.g., a surface facing the inside of the housing 104), one or more planar elements implementing a display and, in some examples, a touch screen. For example, the module 300 can include a light emitter such as a backlight 408, as well as at least one display layer 412. The backlight 408 can, in some examples, include a reflector. In some examples, the module 300 includes a plurality of display layers, such as touch-sensitive films, liquid crystal display (LCD) films, additional glass sheets, optically transparent adhesive (OCA) layers and the like, stacked between the backlight 408 and the outer layer 120.

The module 300 can also include a frame 416 configured to surround the backlight 408 and display layer(s) 412, e.g., to couple the backlight 408 and display layer(s) 412 to the outer layer 120. The frame 416 can also couple the backlight 408 and display layer(s) 412 to a cover 420 disposed adjacent to an inner surface 424 of the backlight 408. In other examples, the backlight 408 can be coupled to the cover 420 via an adhesive, in addition to or instead of the frame 416.

The cover 420 is a non-conductive member having a perimeter that substantially matches the perimeter of the backlight 408 and display layer(s) 412. The cover 420 further extends substantially continuously over the inner surface 424 of the backlight 408. Thus, when the cover 420 is assembled with the backlight 408 and display layer(s) 412, and the outer layer 120, the cover 420 and the frame 416 can substantially encapsulate the backlight 408 and display layer(s) 412 against the outer layer 120. The outer layer 120, display layer(s) 412, backlight 408, and cover 420, can be referred to as a display sub-assembly 428. The cover 420, the outer layer 120, and the frame 416, can cooperate to mitigate or prevent dust ingress into the display sub-assembly 428 when assembled. The display sub-assembly 428 can therefore be manufactured and/or assembled separately from the remaining components of the display module 300, some of which may be manufactured at different facilities than the components of the sub-assembly 428.

The module 300 further includes a communications sub-assembly 432, including the shield 304. The shield 304 includes a lower surface 436 (facing towards the rear 200 of the device 100, away from the outer layer 120), and an opposing upper surface connected to an antenna 440. The shield 304 includes at least one aperture therethrough, e.g., to mitigate attenuation of signals emitted by the antenna 440 via the generation of eddy currents. In this example, the shield includes two substantially rectangular apertures 444 symmetrically disposed on either side of a slot aperture 448 that extends to the perimeter of the shield 304. A wide variety of other aperture structures and combinations can be employed, according to the performance parameters of the antenna 440. The antenna 440 is partially visible through the aperture 444 and 448 in FIG. 4, and will be shown and described in greater detail below in connection with FIG. 5.

The antenna 440 can be assembled with the shield 304 to form the sub-assembly 432, and the sub-assembly 432 can then be assembled with the sub-assembly 428. The sub-assemblies 428 and 432 can, in some examples, be manufactured and/or assembled at distinct facilities or portions of one facility, and can subsequently be combined to form the module 300. Disposing the antenna 440 on the shield 304 prior to assembling the shield 304 onto the cover 420 can reduce the likelihood of damage to the display sub-assembly 428 during such assembly. Further, disposing the antenna 440 on the shield 304 can allow the antenna 440 to be removed and replaced from the shield 304, e.g., if the antenna 440 is damaged during assembly, without impacting the display sub-assembly 428.

To accommodate the antenna 440 when the sub-assembly 432 is placed onto the cover 420, the cover 420 includes a recess 452 into a lower surface thereof. That is, the recess 452 faces away from the outer layer 120 and towards the shield 304. The recess 452 can have a depth sufficient to receive a thickness of the antenna 440, and can have a perimeter with dimensions substantially equal to the dimensions of the antenna 440.

To connect the shield 304 to the cover 420, the cover 420 can include snap-fit protrusions 456, e.g., arranged about a perimeter of the cover 420. The shield 304 can include openings 460 corresponding to the protrusions 456, and configured to releasably receive the protrusions to mount the shield 304 onto the cover 420. In some examples, the recesses and/or the shield 304 can be deformed to release the shield 304 from the cover 420, e.g., to replace the antenna 440 without disassembling the display sub-assembly 428.

The shield 304 further includes a port 464, through which a connector 468 of the antenna 440 can extend when the antenna 440 is mounted on the shield 304. The connector 468 can be connected to a controller or other suitable component of the device 100, e.g., via flex cables, circuit boards, and the like. The module 300 can also include a connector sub-assembly 472, e.g., including a first end 476 configured to connect to controller(s) or other suitable components within the housing 104, and a second end 480 configured to connect with the display layer(s) 412 and the backlight 408. The first end 476 can be affixed to the surface 436 of the shield 304, and the second end 480 can wrap around edges of the shield 304 and cover 420 to connect with the backlight 408 and display layer(s) 412.

Figure 5:
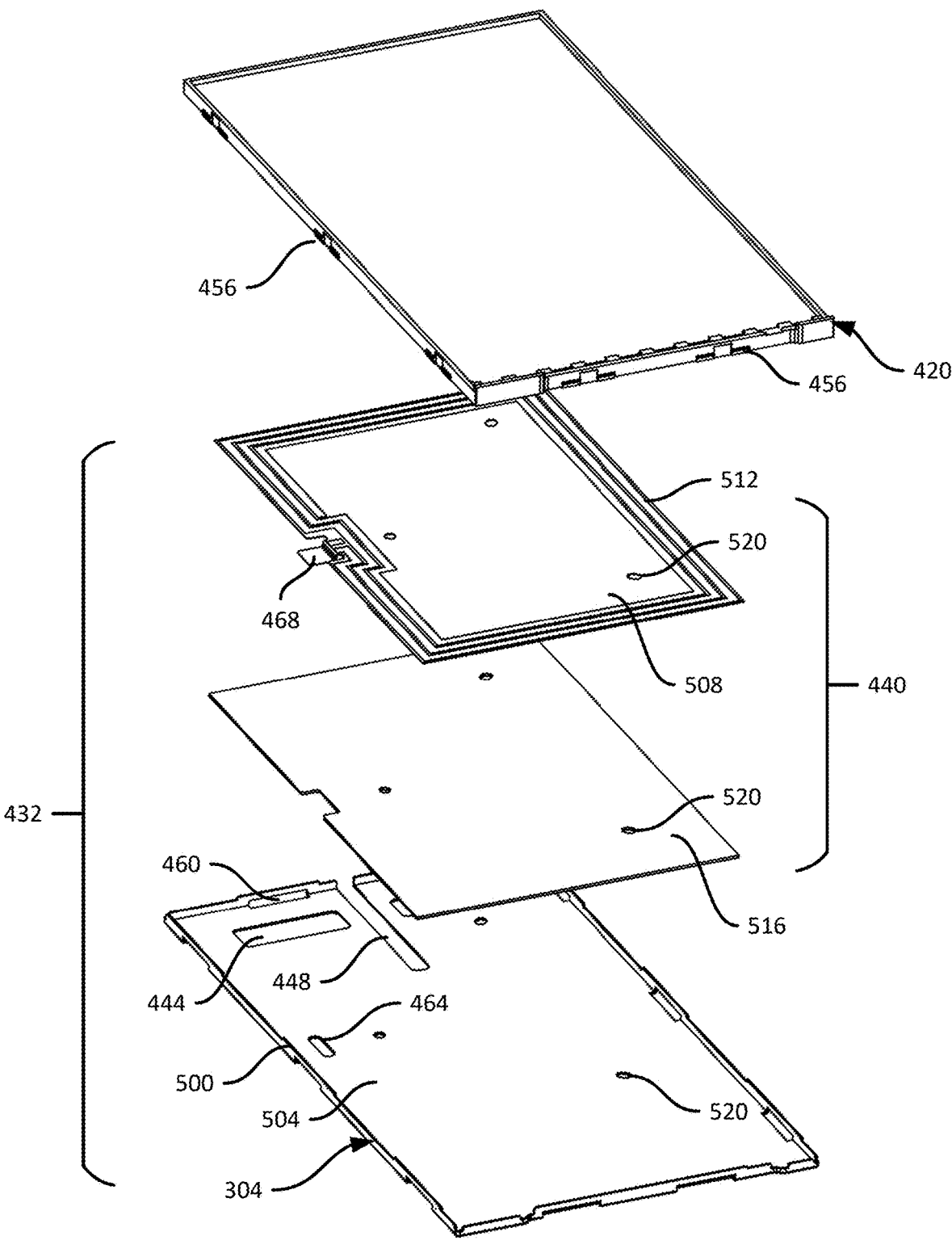
FIG. 5 is an exploded view of a communications sub-assembly of the module of FIG. 4.

Turning to FIG. 5, the cover 420 and communications sub-assembly 432 are shown in isolation from the remainder of the module 300, from the top (e.g., the surfaces facing towards the outer layer 120). As seen in FIG. 5, the shield 304 can include a perimeter wall 500 extending from an upper surface 504 (opposite the lower surface 436) towards the cover 420. The antenna 440 includes a substrate 508, such as a flexible circuit board or the like, carrying conductive antenna elements 512 such as circuit traces, terminating at the connector 468. The antenna 440 also includes an antenna shield 516, such as a ferrite sheet affixed to the substrate 508. The shield 516, carrying the substrate 508, can be affixed (e.g., via adhesive or other suitable fasteners) to the upper surface 504 of the shield 304, within a volume defined by the upper surface 504 and the wall 500. One or more of the shield 304, the antenna shield 516, and the substrate 508 can include alignment holes 520 or other suitable alignment structures to facilitate the alignment of the components of the sub-assembly 432.

As seen in FIG. 4 and FIG. 5, the placement of the antenna elements 512 relative to the other components of the module 300 may provide improved antenna performance through the display sub-assembly 428, as the conductive shield 304 does not lie between the antenna elements 512 and the outer layer 120. Although the display layer(s) 412 and backlight 408 contain conductive materials, those components are less likely to interfere with the performance of the antenna 440 than the shield 304 due to the smaller mass of such conductive materials in those components.

Figure 6:
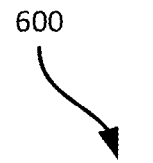
FIG. 6 is a flowchart of a method of assembling the module of FIG. 4.
Figure 6:
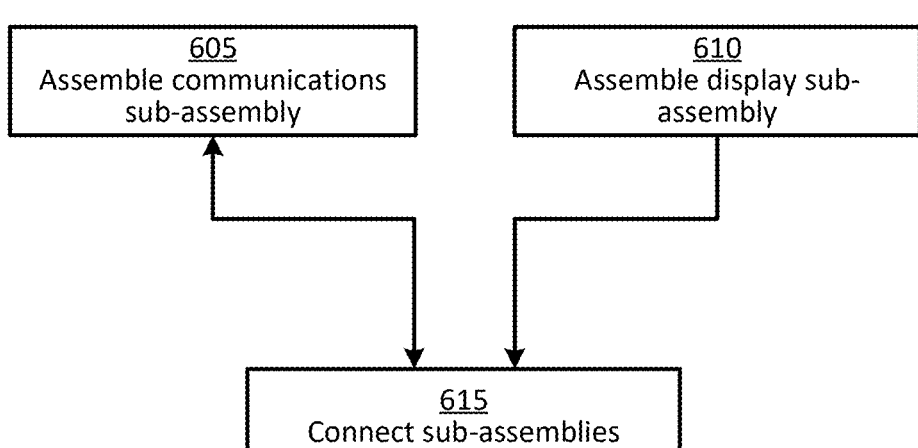

Turning to FIG. 6, a method 600 of assembly of the module 300 will be apparent from the discussion above. In particular, at block 605 the communications sub-assembly 432 is assembled, e.g., by affixing the antenna 440 to the inner surface 504 of the shield 304. At block 610, e.g., in parallel with block 605 (although blocks 605 and 610 can be performed in any order, and at different physical locations), the display sub-assembly 428 can be assembled. The display sub-assembly 428 and communications sub-assembly 432 can then be connected together at block 615, e.g., after transport to a common assembly location. As indicated by the double-ended arrow connecting blocks 605 and 615, the performance of blocks 615 and 605 may be reversed in some cases, e.g., removing the communications sub-assembly 432 from the display sub-assembly 428 (reversing block 615) to repair or replace the antenna 440 (reversing block 605).

Figure 7:
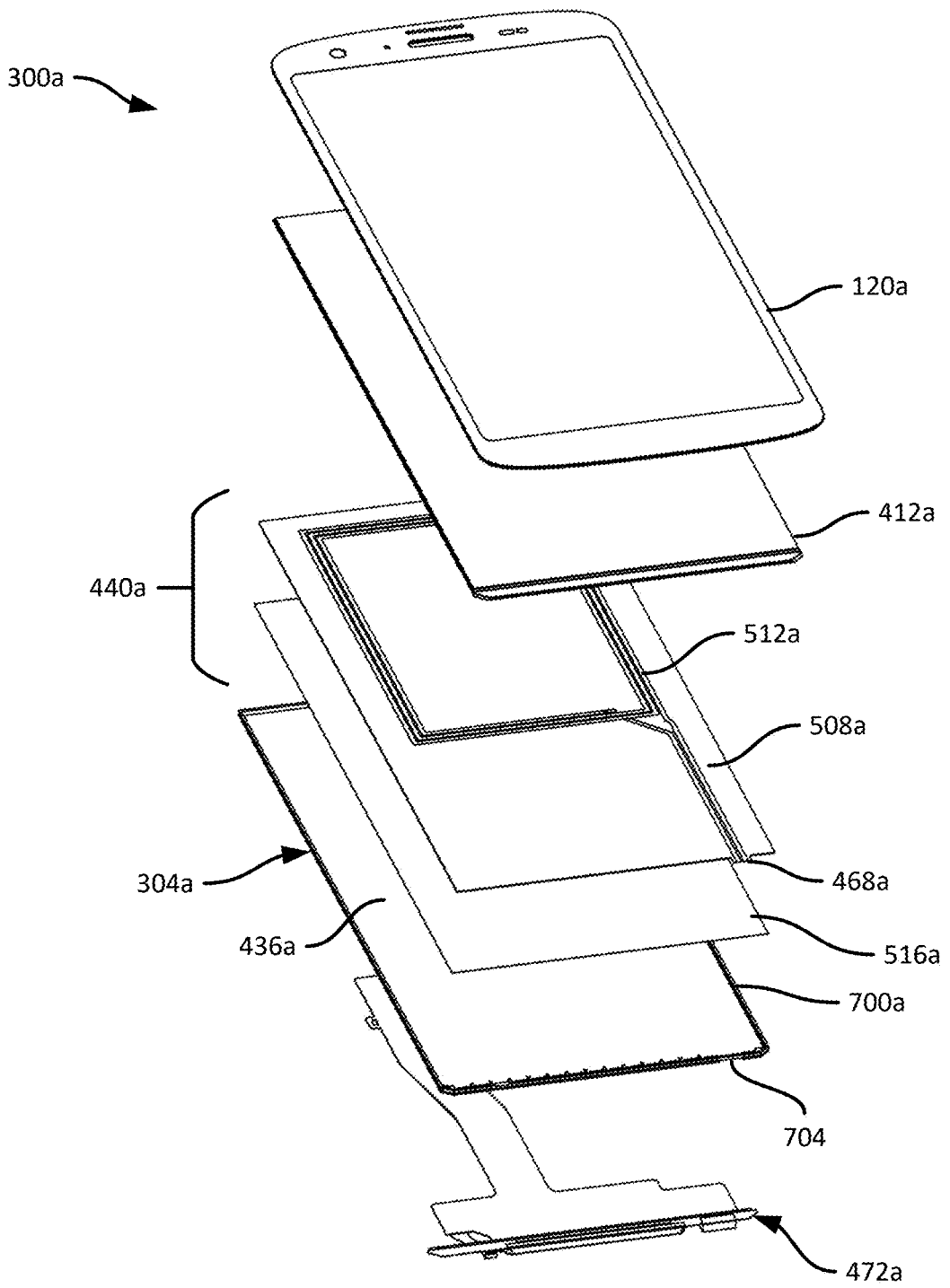
FIG. 7 is an exploded view of a display module according to another embodiment.

In other examples, the cover 420 can be omitted, e.g., to reduce the thickness of the device 100 (e.g., the distance between the outer layer 120 and the rear 200). Reduction of device thickness may be involved in implementing the device 100 in a smartphone form factor, and/or to accommodate additional internal components, to reduce manufacturing costs, or the like. Turning to FIG. 7, an exploded view of an example module 300a is illustrated, in which the cover 420 is omitted. The module 300a includes an outer layer 120a, as well as display layer(s) 412a a backlight coupled to the underside of the layer(s) 412a. The module 300a further includes an antenna 440a, including a substrate 508a carrying antenna elements 512a, and an antenna shield 516a such as a ferrite sheet. The shield 304a includes a wall 700a, and the antenna 440a can be affixed to an upper surface 436a of the shield 304a. The wall 700a, in this example, includes a cutout 704 to allow passage of a connector 468a of the antenna 440a, which can be coupled (e.g., by soldering or the like) to a connector sub-assembly 472a of the module 300.

Assembly of the module 300 can involve fastening the antenna 440a, e.g., via an adhesive or other suitable fastener, directly to the backlight or other component connected to the layer(s) 412, and fastening the shield 304a to the antenna 440a. The module 300, once assembled, may therefore not readily permit disassembly to service the antenna 440a.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A computing device, comprising:
a housing;
a display assembly supported by the housing, the display assembly including:
an outer layer disposed at an exterior of the housing;
a conductive shield disposed within the housing;
a light emitter and a display layer disposed between the outer layer and the conductive shield;
an antenna mounted between the conductive shield and the light emitter, the antenna configured for wireless communication through the outer layer; and
a cover disposed between the light emitter and the antenna, the cover and the outer layer substantially enclosing the light emitter and the display layer, wherein the conductive shield is coupled to the cover.

2. The computing device of claim 1, wherein a perimeter of the conductive shield corresponds to a perimeter of the light emitter.

3. The computing device of claim 1, wherein the conductive shield includes an aperture configured to mitigate eddy currents in the conductive shield associated with the antenna.

4. The computing device of claim 1, wherein the antenna includes (i) a substrate carrying an antenna element, and (ii) a ferrite sheet between the substrate and the conductive shield.

5. The computing device of claim 4, wherein the conductive shield includes a port; and
wherein the substrate supports a connector coupled with the antenna element, the connector extending through the port.

6. The computing device of claim 1, wherein the conductive shield is removably coupled to the cover; and
wherein the antenna is coupled to an upper surface of the conductive shield, the upper surface facing towards the cover.

7. The computing device of claim 1, wherein the conductive shield includes an opening; and wherein the cover includes a snap-fit protrusion configured to extend through the opening to releasably couple the conductive shield to the cover.

8. The computing device of claim 1, wherein the cover includes a recess configured to accommodate the antenna.

9. A display module for a computing device, the display module comprising:
a display sub-assembly including:
an outer layer;
a display layer; and
a backlight; and
a communications sub-assembly including:
a conductive shield; and
an antenna mounted to a surface of the conductive shield configured to face towards the backlight, the antenna configured for wireless communication through the outer layer;
wherein:
the display sub-assembly further comprises a cover encapsulating the backlight and the display layer against the outer layer, and
the conductive shield is configured for mounting to the cover to place the antenna between the conductive shield and the cover.

10. The display module of claim 9, wherein the cover includes a recess configured to accommodate the antenna.

11. The display module of claim 9, wherein the conductive shield includes an opening; and wherein the cover includes a snap-fit protrusion configured to extend through the opening to releasably couple the conductive shield to the cover.

12. The display module of claim 9, wherein the antenna includes (i) a substrate carrying an antenna element, and (ii) a ferrite sheet between the substrate and the conductive shield.

13. The display module of claim 9, wherein the antenna is fastened directly to the display sub-assembly.

* * * * *